United States Patent
Pan

(10) Patent No.: US 8,838,188 B1
(45) Date of Patent: Sep. 16, 2014

(54) METHOD AND APPARATUS FOR REDUCING POWER CONSUMPTION IN A PORTABLE ELECTRONIC DEVICE

(71) Applicant: Marvell International Ltd., Hamilton (BM)

(72) Inventor: Qi Pan, Shanghai (CN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/167,404

(22) Filed: Jan. 29, 2014

Related U.S. Application Data

(63) Continuation of application No. 13/960,433, filed on Aug. 6, 2013, now Pat. No. 8,649,829, which is a continuation of application No. 12/130,885, filed on May 30, 2008, now Pat. No. 8,504,121.

(60) Provisional application No. 60/940,843, filed on May 30, 2007.

(51) Int. Cl.
*H04M 1/00* (2006.01)
*H04W 52/02* (2009.01)

(52) U.S. Cl.
CPC .................... *H04W 52/0235* (2013.01)
USPC ........................................ 455/574

(58) Field of Classification Search
USPC ........................................ 455/574
See application file for complete search history.

(56) References Cited

U.S. PATENT DOCUMENTS

| | | | |
|---|---|---|---|
| 6,041,217 | A | 3/2000 | Martin et al. |
| 7,369,815 | B2 | 5/2008 | Kang et al. |
| 7,899,418 | B2 | 3/2011 | Ishiyama et al. |
| 2008/0229050 | A1 | 9/2008 | Tillgren |

*Primary Examiner* — Joel Ajayi

(57) ABSTRACT

A method and apparatus for reducing power consumption of a portable electronic device, such as a smartphone, or other portable devices when in sleep mode. A low power mode core stay alive while the electronic device is in sleep mode. When implemented in a smartphone, for example, the low power mode core may react to an incoming call so that at least part of the external memory of the smartphone may be powered down. The low power mode core may acknowledge the incoming call and provide a user interface for answering the call before the operating system is resumed, so as to keep the same or similar phone usage experience as the operating system is processing the incoming call. At the same time, the low power mode core may wake up the operating system. The same approach is applicable in monitoring devices, where the entire device need not be running.

15 Claims, 2 Drawing Sheets

METHOD AND APPARATUS FOR REDUCING POWER CONSUMPTION IN A PORTABLE ELECTRONIC DEVICE

CROSS REFERENCE TO RELATED APPLICATION

This application is a continuation of U.S. application Ser. No. 13/960,433, filed on Aug. 6, 2013, which is a continuation of U.S. application Ser. No. 12/130,885, now issued as U.S. Pat. No. 8,504,121, filed on May 30, 2008, which claims the benefit of U.S. Provisional Application No. 60/940,843, filed on May 30, 2007. The disclosures of the applications referenced above are incorporated herein by reference in their entireties.

BACKGROUND

1. Field of the Invention

The present invention relates generally to power management, and more particularly to a method of reducing power consumption in a portable electronic device.

2. Description of Related Art

Continued advancements in telecommunication technologies have made mobile phones, smartphones and other portable electronic devices very popular. Because talk time and standby time are important performance attributes of such devices, techniques for extending battery life or otherwise reducing power consumption are becoming increasingly important.

To extend battery life, a smartphone may enter a low power mode (or sleep mode) when it is idle, that is, when the smartphone is on but there is no interaction with any user or any user terminal. While in sleep mode, a phone may turn off much of its circuitry until the smartphone is awakened, e.g., by a user input or an incoming call. However, the external memory of existing smartphones, e.g., DDR (Double Data Rate memory) or SDRAM (Synchronous Dynamic Random Access Memory), cannot be fully powered down and has to be put into a self refresh mode or other low power mode which can retain the content of the external memory. One reason behind this is to avoid missing incoming calls, since the smartphone needs to acknowledge an incoming call in a few milliseconds, but it may take much longer to restore the external memory and the operation of the phone if the external memory is fully powered down.

A laptop computer may use the hibernate feature to save battery power, where the content of its RAM may be written to non-volatile storage, such as a hard disk drive, before powering down the system. When being turned on again, the system can be restored to the state it was in when the hibernation was invoked, so that programs can continue to be executed as if the hibernation never happened. Although resuming from hibernation is faster than a hard reboot, it may take several seconds, much longer than the time in which a smartphone is required to acknowledge an incoming call.

Since keeping external memory of a smartphone in self refresh mode consumes considerable power, it may be desirable to provide a method and apparatus which can reduce power consumption of a smartphone while in sleep mode.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present application describes a method and apparatus for reducing power consumption of a smartphone, a mobile phone or other portable electronic devices while in sleep mode. A small software agent, or a low power mode core, operates so that, while the device is in sleep mode, the low power mode core may be kept alive and may react to baseband events, such as an incoming call, so that at least part of the external memory of the smartphone may be powered down. When there is an incoming call, the low power mode core may acknowledge the call and provide a user interface (UI) for answering the call before the operating system (OS) of the smartphone is resumed, so as to keep the same or similar phone usage experience as the operating system is processing the incoming call. At the same time, the low power mode core may wake up the operating system.

The low power mode core may be put into an internal SRAM (Synchronous Random Access Memory) and kept alive during the sleep mode, so that the entire external memory may be powered down after its content has been backed up in non-volatile storage spaces (e.g., NAND or NOR flash memory). Alternatively, the low power mode core may be put into one area of the external memory, so that other areas of the external memory may be powered down. Consequently, at least part of the external memory of the smartphone may be powered down during the sleep mode, and the battery life of the smartphone may be improved. The invention may be carried out by computer-executable instructions. Advantages of the present invention will become apparent from the following detailed description.

Figure 1:
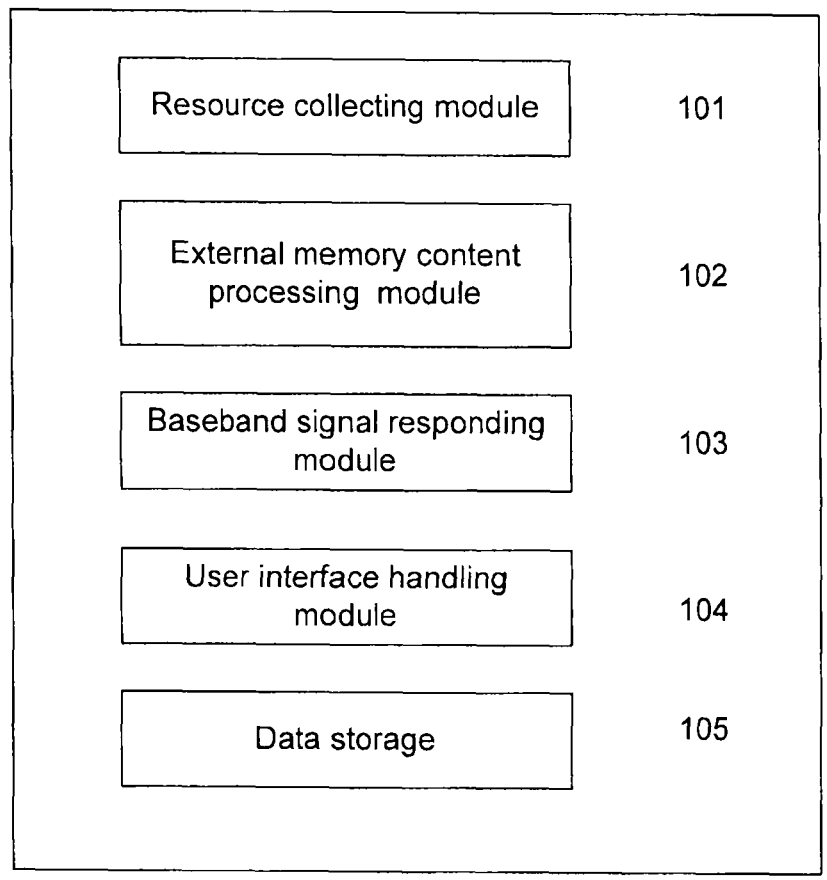
FIG. 1 illustrates an architecture of a low power mode core of a smartphone according to one embodiment of the present invention.

FIG. 1 illustrates an architecture of a low power mode core of a smartphone according to one embodiment of the present invention. The low power mode core may include a small self executable software agent, which may reside in the internal SRAM or one area of the external memory. As shown, in one embodiment, the low power mode core 100 of a smartphone may include: a resource collecting module 101, an external memory content processing module 102, a baseband signal responding module 103, a user interface handling module 104 and a data storage area 105.

One popular feature of smartphones is to display a caller's name or play a ring tone associated with a caller when there is an incoming call, instead of only displaying a caller's phone number, so that the called party may easily find out who is calling and decide whether to answer the call. If the external memory is kept in self refresh mode, the operating system of the smartphone may simply access a phone database to get the caller's name or ring tone, and then display or play them.

In an embodiment of the present invention, while a device is in sleep mode, only the low power mode core 100 is kept alive while the rest of the external memory and the operating system are powered down. To make sure that the user of the smartphone will have the same or similar user interface when there is an incoming call, the resource collecting module 101 may collect information needed to display a user interface, from the phone database of the smartphone, before the smartphone enters into sleep mode. In one embodiment, the smartphone is configured to display a caller's name when there is an incoming call, then the information collected by the resource collecting module 101 may include the user's contacts' names and phone numbers. In one embodiment, the smartphone is configured to play a ring tone associated with a caller when there is an incoming call. In such a case, the information collected may include the user's contacts' phone numbers and associated ring tones. The collected information may be contained in the data storage area 105. Consequently, the low power mode core 100 may present the same or similar user interface to the user of the smartphone when there is an incoming call, even though the operating system of the smartphone has not come fully out of hibernation.

In one embodiment, the collected information may also include the user's greeting to callers when the user cannot take the call.

The external memory content processing module 102 may compress content in the external memory and store the compressed content into a non-volatile storage space before the operating system of the smartphone enters hibernation mode. The non-volatile storage space may be, e.g., a main flash. When the operating system of the smartphone is awakened, the content in the non-volatile storage space may be decompressed and the decompressed content may be stored back to the external memory. The operating system may continue to execute programs as if it had never entered the hibernation mode.

The baseband signal responding module 103 may respond to baseband events. In one embodiment, the baseband event is an incoming call. The baseband signal responding module 103 may inform the calling party that the smartphone is available/unavailable to answer the incoming call, and may inform the user interface handling module 104 about the incoming call so that the module 104 may provide a proper user interface. At the same time, the baseband signal responding module 103 may inform the external memory content processing module 102 about the incoming call so that the module 102 may start to decompress and restore previously compressed content. The baseband signal responding module 103 may also wake up the operating system of the smartphone so that the operating system may control the remaining procedure for processing the incoming call when the operating system is fully resumed.

When being informed that there is an incoming call, the user interface handling module 104 may provide appropriate user interfaces. For example, with information collected by the resource collecting module 101, the user interface handling module 104 may present a caller's name on the screen of the smartphone, or play a ring tone associated with a caller, depending on how the user has configured the smartphone. Thus, the user may have the same or similar phone usage experience as when the operating system of the smartphone is processing the incoming call. In one embodiment, when the user of the smartphone is unavailable to take the call, the user interface handling module 104 may play a greeting stored by the user to the caller.

The data storage area 105 may contain data needed during execution of the low power mode core 100, including data collected by the resource collecting module 101 from the phone database of the smartphone such as the user's contacts' phone numbers, names, associated ring tones and the user's greeting to callers. In one embodiment, the data collected by the resource collecting module 101 may be stored in external non-volatile storage devices, and the low power mode core may access the data using a device driver.

Figure 2:
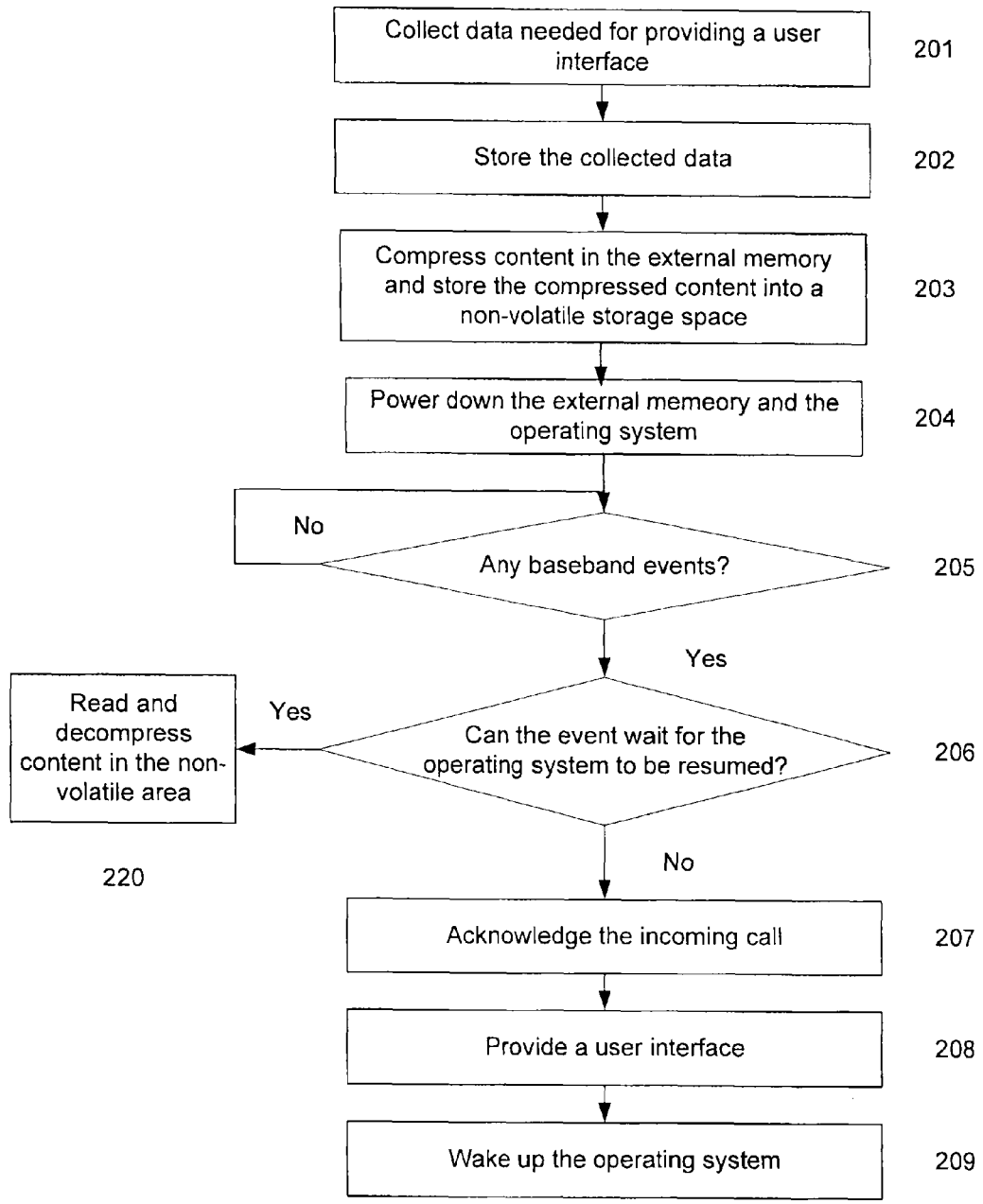
FIG. 2 illustrates a flow chart of the operation of a low power mode core in a smartphone according to one embodiment of the present invention.

FIG. 2 illustrates a flow chart of the operation of a low power mode core in a smartphone according to one embodiment of the present invention.

At 201, when the operating system of the smartphone is running, the resource collecting module 101 may collect information needed to provide user interfaces when the low power mode core 100 responds to an incoming call. Such information may help to keep the incoming call response experience similar when either the low power mode core 100 or the smartphone's operating system responds to an incoming call. The collected information may include the user's contacts' phone numbers, names, associated ring tones and the user's greeting to callers.

At 202, the collected information may be stored in the data storage area 105.

At 203, the external memory content processing module 102 may compress content of the external memory and store the compressed content into a non-volatile storage space.

At 204, at least part of the external memory may be powered down. If the internal SRAM is available, the low power mode core may reside there, and the entire external memory of the smartphone may be powered down after its content is stored in a non-volatile storage space at 203. If there is no available internal SRAM, the low power mode core 100 may reside in a portion of the external memory after the content of the external memory is stored in a non-volatile storage space. The portion of the external memory in which the low power mode core 100 resides may be kept in self refresh mode, and the rest of the external memory may be powered down. The operating system may then enter hibernation mode.

At 205, it is determined whether there are any baseband events.

If there is a baseband event, it may be determined at 206 whether it is an event requiring response before the operating system is resumed. In one embodiment, the time required for the operating system to be resumed and the time required for responding various baseband events are stored in the data storage area 105.

If a baseband event can wait for the operating system to resume, the process may proceed to 220. Such a baseband event may be, e.g., a short message (SMS) or a multimedia message (MMS). At 220, the low power mode core 100 may only need to read the content of the external memory from the non-volatile storage space and decompress and restore the content by its external memory content processing module 102.

If the time required for resuming the operating system is longer than the time period during which a baseband event, e.g., an incoming call, must be acknowledged, the baseband event responding module 103 may acknowledge the incoming call at 207.

In one embodiment, events may be categorized as: events that may be handled by the low power mode core, and events requiring the operating system to be resumed. The low power mode core may handle events belonging to the first category and wake up the operating system for events belonging to the second category.

At 208, the user interface handling module 104 may provide user interfaces with information collected by the resource collecting module 101 and according to the user's configuration of the smartphone, so that the user may have the same or similar phone usage experience as when the operating system is processing the incoming call.

The low power mode core 100 may wake up the operating system at 209. Although 209 is shown after 208, it should be understood that it may happen immediately after 205.

Although the embodiments above use a smartphone as an example, the invention may be used in any portable or other electronic devices which use batteries and need to acknowledge or send out signals before a hibernated operating system fully resumes. One example is a device monitoring a patient's medical condition, in which the device has to send out an alarm as soon as a threshold value is reached and therefore cannot wait for the operating system to fully resume.

Several features and aspects of the present invention have been illustrated and described in detail with reference to particular embodiments by way of example only, and not by way of limitation. Alternative implementations and various modifications to the disclosed embodiments are within the scope and contemplation of the present disclosure. Therefore, it is intended that the invention be considered as limited only by the scope of the appended claims.

What is claimed is:

1. A device configured to enter into a low power mode, the device comprising:
   an operating system configured to be powered down while the device is in the low power mode; and
   a memory configured to store, in a first area of the memory, information that is accessible by the operating system to (i) process an event according to a first usage experience, wherein the first area of the memory is also configured to be powered down while the device is in the low power mode,
   wherein the memory is further configured to store, in a second area of the memory, a low power mode core that is configured to operate while the device is in the low power mode, wherein the low power mode core comprises
      a resource collecting module configured to, prior to the device entering in the low power mode, collect the information that is accessible by the operating system to process the event, and
      a user interface handling module configured to, in response to the event occurring while (i) the device is in the low power mode and (ii) the operating system is powered down, provide a user interface to process the event according to a second usage experience, wherein the user interface is provided based on the information collected by the resource collecting module prior to the device entering in the low power mode, and wherein the second usage experience is the same as or similar to the first usage experience as if the operating system were processing the event.

2. The device of claim 1, wherein the low power mode core further comprises a data storage area configured to store the information collected by the resource collecting module.

3. The device of claim 1, wherein the second area of the memory is configured to be placed in a self refresh mode while the device is in the low power mode.

4. The device of claim 1, wherein:
   the device comprises a smartphone;
   the information that is accessible by the operating system comprises (i) a name of a contact, and (ii) a phone number associated with the contact;
   the event comprises an incoming call; and
   in response to the incoming call occurring while (i) the device is in the low power mode and (ii) the operating system is powered down, the user interface provided by the user interface module includes (i) the name of the contact and (ii) the phone number associated with the contact.

5. The device of claim 4, wherein the information that is accessible by the operating system further comprises a ring tone associated with the contact.

6. The device of claim 1, wherein:
   the low power mode core further comprises a baseband signal responding module configured to, in response to the event occurring while (i) the device is in the low power mode and (ii) the operating system is powered down, determine whether the event requires a response prior to the operating system being resumed,
   wherein, in response to the device requiring a response prior to the operating system being resumed, the baseband signal responding module is configured to inform the user interface module to provide the user interface.

7. The device of claim 1, wherein the device is a portable electronic device.

8. The device of claim 1, wherein the device is configured to monitor a medical condition of a patient.

9. The device of claim 1, wherein the device is configured to enter into the low power mode in response to the device being idle.

10. A method for a device to process an event subsequent to the device having entered into a low power mode, wherein the device includes an operating system and a memory, the method comprising:
    storing, in a first area of the memory, information that is accessible by the operating system to (i) process an event according to a first usage experience, wherein each of the operating system and the first area of the memory is configured to be powered down while the device is in the low power mode; and
    storing, in a second area of the memory, a low power mode core that is configured to operate while the device is in the low power mode, wherein the low power mode core
       prior to the device entering in the low power mode, collects the information that is accessible by the operating system to process the event, and
       in response to the event occurring while (i) the device is in the low power mode and (ii) the operating system is powered down, provides a user interface to process the event according to a second usage experience, wherein the user interface is provided based on the information collected prior to the device entering in the low power mode, and wherein the second usage experience is the same as or similar to the first usage experience as if the operating system were processing the event.

11. The method of claim 10, further comprising placing the second area of the memory in a self refresh mode while the device is in the low power mode.

12. The method of claim 10, wherein the low power core further, in response to the event occurring while (i) the device is in the low power mode and (ii) the operating system is powered down, determines whether the event requires a response prior to the operating system being resumed,
    wherein, in response to the device requiring a response prior to the operating system being resumed, the low power core provides the user interface.

13. A computer program, tangibly stored on a non-transitory medium, for permitting a device to process an event subsequent to the device having entered into a low power mode, and wherein the device includes an operating system and a memory, and wherein the computer program comprises computer executable instructions to cause a programmable processor to:
    store, in a first area of the memory, information that is accessible by the operating system to (i) process an event according to a first usage experience, wherein each of the operating system and the first area of the memory is configured to be powered down while the device is in the low power mode; and store, in a second area of the memory, a low power mode core that is configured to operate while the device is in the low power mode, wherein the low power mode core prior to the device entering in the low power mode, collects the information that is accessible by the operating system to process the event, and in response to the event occurring while (i) the device is in the low power mode and (ii) the operating system is powered down, provides a user interface to process the event according to a second usage experience, wherein the user interface is provided based on the information collected prior to the device entering in the low power mode, and wherein the second usage experience is the same as or similar to the first usage experience as if the operating system were processing the event.

14. The computer program of claim 13, further comprising computer executable instructions to cause the programmable processor to place the second area of the memory in a self refresh mode while the device is in the low power mode.

15. The computer program of claim 13, wherein the low power core further, in response to the event occurring while (i) the device is in the low power mode and (ii) the operating system is powered down, determines whether the event requires a response prior to the operating system being resumed, wherein, in response to the device requiring a response prior to the operating system being resumed, the low power core provides the user interface.

\* \* \* \* \*